United States Patent
Chen et al.

(10) Patent No.: US 10,608,907 B2
(45) Date of Patent: Mar. 31, 2020

(54) OPEN-LOOP CONTROL ASSISTANT TO GUIDE HUMAN-MACHINE INTERACTION

(71) Applicant: AT&T Intellectual Property I, L.P., Atlanta, GA (US)

(72) Inventors: Chuxin Chen, San Francisco, CA (US); George Dome, Tinton Falls, NJ (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/977,063

(22) Filed: May 11, 2018

(65) Prior Publication Data

US 2019/0349275 A1   Nov. 14, 2019

(51) Int. Cl.
*H04L 12/26* (2006.01)
*H04L 12/42* (2006.01)
*G06N 20/00* (2019.01)

(52) U.S. Cl.
CPC ............ *H04L 43/08* (2013.01); *G06N 20/00* (2019.01); *H04L 12/42* (2013.01)

(58) Field of Classification Search
CPC .......... H04L 43/08; H04L 12/42; G06N 20/00
See application file for complete search history.

(56) References Cited

U.S. PATENT DOCUMENTS

| | | |
|---|---|---|
| 9,742,790 B2 | 8/2017 | Sood et al. |
| 2014/0317261 A1 | 10/2014 | Shatzkamer et al. |
| 2017/0063714 A1 | 3/2017 | Xiang |
| 2017/0134237 A1 | 5/2017 | Yang et al. |
| 2017/0272354 A1 | 9/2017 | Chen |
| 2017/0295082 A1 | 10/2017 | Wu et al. |
| 2017/0346831 A1 | 11/2017 | Liu |
| 2018/0013586 A1 | 1/2018 | Wang |
| 2018/0024866 A1 | 1/2018 | Yoshimura et al. |
| 2018/0176088 A1* | 6/2018 | Ellappan ............. H04L 41/0893 |
| 2018/0260745 A1* | 9/2018 | Jana ................... G06Q 10/0631 |

FOREIGN PATENT DOCUMENTS

| | | |
|---|---|---|
| WO | WO 2016/149945 | 9/2016 |
| WO | WO 2017/206092 | 12/2017 |
| WO | WO 2017/222595 | 12/2017 |

OTHER PUBLICATIONS

Mestres. Knowledge Defined Networking. ACM SIGCOMM Computer Communication Review vol. 47 Issue 3, Jul. 2017 (Year: 2017).*

* cited by examiner

*Primary Examiner* — Bryan Lee
(74) *Attorney, Agent, or Firm* — Hartman & Citrin LLC

(57) ABSTRACT

An open-loop control assistance ("OLCA") system can collect data, correlate and aggregate the data, and perform multi-dimensional analytics on the correlated and aggregated data. The OLCA system can then determine plurality of viable options for a next action to be taken by an operator in an open-loop control process, and can determine a specific option as an optimal choice for the operator to select. The OLCA system can present the plurality of viable options and a rationale explaining why the operator should select the specific option. The OLCA system can capture action(s) taken by the operator, and if the action does not correspond to the recommended action, the OLCA system can capture a reason regarding why the optimal choice was not selected. The OLCA system can analyze results from the action(s). The OLCA system can then fine-tune the open-loop control process based upon the results and the cause(s) thereof.

20 Claims, 10 Drawing Sheets

OPEN-LOOP CONTROL ASSISTANT TO GUIDE HUMAN-MACHINE INTERACTION

BACKGROUND

Network functions virtualization ("NFV") is a new technology initiative that aims to move traditional and evolving mobility networking functions, such as access network elements, core network elements, transport network elements, and others, from purpose-built hardware to commercial-off-the-shelf ("COTS") server-based platforms. This is achieved through virtualization of mobility networking functions to create virtual networking functions ("VNFs") that operate on COTS hardware.

Software-defined network ("SDN") is an architectural framework that provides a software-centric cloud environment for creating intelligent networks that are programmable, application aware, and more open. SDN provides an agile and cost-effective communications platform for handling the dramatic increase in data traffic on carrier networks by providing a high degree of scalability, security, and flexibility. SDN provides several benefits over traditional networks. SDN allows for the creation of multiple virtual network control planes on common hardware. SDN helps extend service virtualization and software control into many existing network elements. SDN enables applications to request and manipulate services provided by the network and to allow the network to expose network states back to the applications. SDN exposes network capabilities through application programming interfaces ("APIs"), making the control of network equipment remotely accessible and modifiable via third-party software clients using open protocols such as OpenFlow, available from Open Network Forum ("ONF").

Combining SDN and NFV functionality, such as in Domain 2.0, available from AT&T, provides a highly complex and dynamic set of relationships between virtual, logical, and physical resources. Networks, such as embodied in Domain 2.0 deployments, provide intelligent software systems and applications operating on general purpose commodity hardware (e.g., COTS). This not only drives down capital expenditures, ongoing operational costs, and helps to configure networks with less human intervention, but also creates significant opportunities to scale and monetize existing and new intelligent services.

Within service providers, such as AT&T, orchestration systems like enhanced control, orchestration, management, and policy ("ECOMP") have been created to dramatically reduce monotonous tasks and monitoring required by human operators through data-based analytics. Current orchestration systems often incite frustration among operators due to over-complicated network status readouts, non-specific network manipulations automatically performed by the orchestration system, and the inability to quickly "revert" changes caused by such manipulations. AT&T's ECOMP has been combined with the Open Orchestrator Project ("OPEN-O") to create the Open Network Automation Platform ("ONAP") project supported by the Linux Foundation. ONAP is an open source software platform that delivers capabilities for the design, creation, orchestration, monitoring, and life cycle management of SDNs and the VNFs operating therein, as well as higher-level services that utilize the functionality of SDN/VNF. ONAP provides automatic, policy-driven interaction of these functions and services in a dynamic, real-time cloud environment. ONAP also provides graphical design tools for function/service creation.

A closed-loop control mechanism is a main feature in automated life cycle management of VNFs in SDNs, but open-loop control remains a necessary part of the overall control process for managing VNFs and physical network functions ("PNFs") in hybrid networks. Open-loop control remains necessary due to potential fallout in the closed-loop control process, and certain steps in the control process still require human intervention by design (e.g., an approval step in a workflow). Moreover, the current human-on-the-loop automation process has not yet reached the end goal of having capabilities equal to or better than the capabilities of closed-loop control.

Service assurance structured workflows (e.g., SaSHA) are available that guide, assist, and/or automate manual work efforts, including tickets and service, or more typically, manual decisions made by an operator that differs from one person to another depending on the judgment call by that person, often based on his/her experience. The lessons learned by the operators are often not captured and retained by existing workflow systems, but instead rely on the operator's memory, and might take a long time to be reflected in operator guidelines or guided workflows, if at all.

SUMMARY

Concepts and technologies disclosed herein are directed to an open-loop control assistant to guide human-machine interaction. According to one aspect of the concepts and technologies disclosed herein, an open-loop control assistance ("OLCA") system can include a processor and memory having instructions stored thereon that, when executed by the processor, cause the processor to perform operations. In particular, the OLCA system can collect data from a plurality of sources. The OLCA system can correlate and aggregate the data to create correlated and aggregated data. The OLCA system can perform multi-dimensional analytics on the correlated and aggregated data. The OLCA system, based upon the multi-dimensional analytics, can determine a plurality of viable options for a next action to be taken by an operator in an open-loop control process. The OLCA system can determine a specific option of the plurality of viable options as an optimal choice for the operator to select. The OLCA system can generate a recommendation for the operator to select the optimal choice from the plurality of viable options. The OLCA system can present the plurality of viable options to the operator and a rationale explaining why the operator should select the specific option as the optimal choice from the plurality of viable options. The OLCA system can capture an action taken by the operator, and if the action does not correspond to a specific action identified in the specific option (i.e., recommended action), then the OLCA system can also capture reasons provided by the operator regarding why the optimal choice was not selected. The OLCA system can analyze results from the action taken by the operator, and can determine whether the results are positive or negative and the cause(s) thereof. The OLCA system can then fine-tune the open-loop control process based, at least in part, upon the results and the cause(s).

In some embodiments, the OLCA system can collect the data from a network automation platform such as ONAP. In these embodiments, the network automation platform can include at least one data lake, a plurality of controllers, and a policy/rule database. The data collected can include, particularly, big-data from the data lake(s), logs from the plurality of controllers, and at least one policy/rule from the policy/rule database.

In some embodiments, the OLCA system can perform the multi-dimensional analytics on the correlated and aggregated data, at least in part, by applying an unsupervised learning technique. The unsupervised learning technique can be implemented via machine learning to identify clusters among the data and to discover any hidden patterns and signatures contained therein.

In some embodiments, the rationale provided by the OLCA system can include a plurality of system decision steps taken by the OLCA system to arrive at the specific option of the plurality of viable options being the optimal choice for the operator to select.

In some embodiments, the OLCA system can fine-tune the open-loop control process, at least in part, by updating a process for generating the recommendation for the operator to select the optimal choice from the plurality of viable options. In other embodiments, the OLCA system can fine-tune the open-loop control process, at least in part, by updating a policy, a rule, a model, an algorithm, a parameter, some combination and/or multiples thereof that have been used during at least one previous instance of the open-loop control process.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The concepts and technologies disclosed herein are directed to an OLCA system to guide human-machine interaction during open-loop control of the life cycle management process of VNFs and PNFs in a hybrid network. According to one aspect of the concepts and technologies disclosed herein, an OLCA system can systematically guide a human operator through the manual process in open-loop control, provide recommendations leading to optimal results, and retain the lessons learned from the experience. The OLCA system can utilize machine learning, integrated with key components of automated lifecycle management of VNFs and PNFs, such as that provided by a network automation platform (e.g., ONAP) and operations support systems ("OSS") platform. The OLCA approach disclosed herein will improve the efficiency, reliability, and predictability of those necessary manual steps taken place in the open-loop control process.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1A:
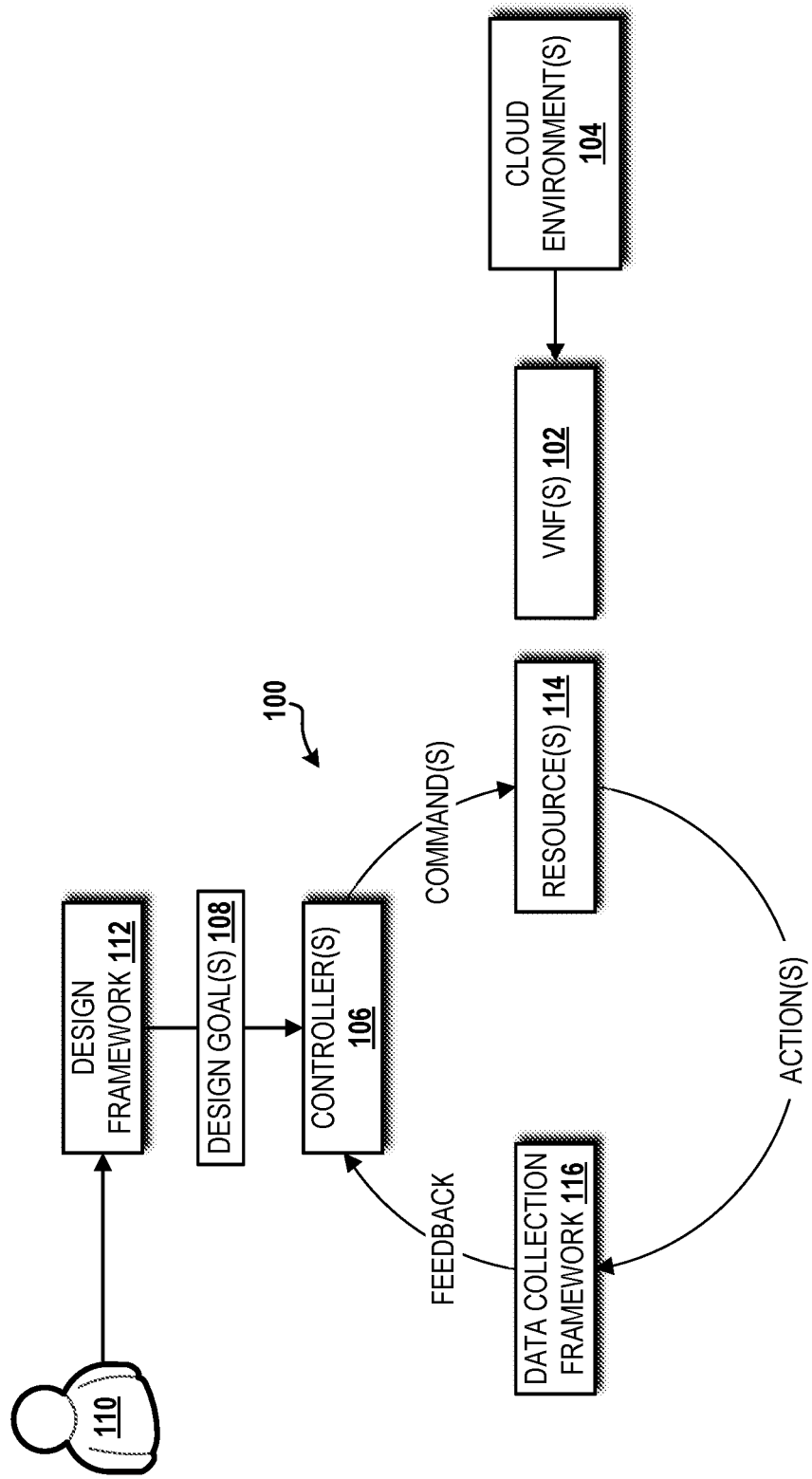
FIG. 1A is a block diagram illustrating aspects of a traditional closed-loop control mechanism for automated lifecycle management of VNFs operating in a cloud network.

Referring now to FIG. 1A, a block diagram illustrating aspects of a traditional closed-loop control mechanism 100 for automated lifecycle management of one or more VNFs 102 operating in one or more cloud environment(s) 104 will be described. The traditional closed-loop control mechanism 100 includes one or more controller(s) 106 that receive one or more design goals 108 specified by one or more operators (also referred to herein as "users") 110 via a design framework 112. The controller(s) 106 send one or more commands to resource(s) 114 (e.g., NFV resources best shown in FIG. 6) that are used to create, control, and manage the VNF(s) 102 in the cloud environment(s) 104. Responsive to the command(s) received from the controller(s) 106, the resource(s) 114 can perform one or more actions, such as instantiating one or more of the VNFs 102, controlling one or more of the VNFs 102, and/or otherwise managing one or more of the VNFs 102. Data associated with these actions can be collected by a data collection framework 116.

The VNFs 102 can include any applications executable by one or more of the resources 114 operating in the cloud environment(s) 104 to perform one or more network functions typically provided by dedicated hardware. More specifically, the VNFs 102 can be routers, switches, firewalls, load balancers, base stations, and any other network functionality that has been decomposed from the PNF and can operate on commodity hardware, such as the resources 114, provided in the cloud environment(s) 104. As such, the concept of a VNF 102 as used herein should not be limited to the virtualization of any specific PNF, and instead, is intended to encompass any possible network function at any layer of a given network, including, for example, an access network, a core network, a transport network, a backbone network, a data center network, and the like.

The cloud environment(s) 104 can provide, at least in part, any type of cloud service or combination of cloud services, such as, for example, Infrastructure as a Service, Platform as a Service, SaaS, and/or Software as a Service. The concepts and technologies disclosed herein can be extended to other cloud-based services known to those skilled in the art. Moreover, one skilled in the art will appreciate the applicability of the concepts and technologies disclosed herein and variations thereof to future cloud services. The cloud environment(s) 104 can include the resources 114 upon which the VNFs 102 are executed to provide, at least in part, one or more cloud services. In some embodiments, the cloud environment(s) 104 are built upon an NFV platform 600 (best shown in FIG. 6).

The controller(s) 106 can be or can include one or more network controllers and/or one or more application controllers. In particular, the controller(s) 106 can be or can include one or more SDN controllers ("SDNCs"). The SDNC(s) can manage the state of one or more SDN networks, such as deployed as or inclusive in the cloud environment(s) 104, and/or specific resources 114 thereof. The SDNC(s) can communicate with other controllers 106, including, for example, one or more orchestrators (not shown), such as a master service orchestrator ("MSO"). The SDNC(s) also can communicate with ONAP subsystems, including, for example, the design framework 112, the data collection framework 116, an execution framework 224 (best shown in FIG. 2), and other ONAP subsystems, including those specifically described herein and others.

One of the controllers 106 embodied as an MSO can perform ONAP orchestration functions, including arranging, sequencing, and implementing tasks based upon rules and/or policies (best shown in FIG. 2) to coordinate the creation, modification, or removal of logical and physical resources in a managed environment, such as provided by one or more of the cloud environments(s) 104. The MSO can manage orchestration at the top level and can facilitate additional orchestration among lower level controllers, such as one or more SDNC or other controllers 106.

The MSO can perform end-to-end service instance provisioning. The MSO can instantiate and release the VNFs 102, as well as perform migration and relocation of the VNFs 102 in support of end-to-end service instantiation, operations, and management. The MSO can be triggered by service requests received from lower level controllers, such as one or more SDNCs, the design framework 112, and/or other systems, subsystems, and frameworks disclosed herein.

The MSO is aware of the state of lower level service controllers among the controllers 106. For example, in some embodiments, the MSO is in communication with VNF controllers that control, at least in part, the operation of one or more of the VNFs 102 at the nodal or VNF pool layer. These VNF-specific and VNF pool-specific service controllers can be tracked by the MSO to maintain synchronized states to extract data. The MSO can use this data to dynamically allocate and/or alter the resource utilization on-demand within a given VNF or across multiple VNFs of the VNFs 102 during the course of network changes or upgrades, error conditions, failover situations, and the like.

The controller(s) 106 also can communicate with other ECOMP/ONAP assets, including the data collection framework 116, an active and available ("AAI") subsystem (not shown), the design framework 112 (e.g., embodied as an SDC) subsystem, and/or other ECOMP/ONAP components, other systems, other subsystems, other networks, any combination thereof, and the like.

An AAI subsystem is an ONAP subsystem that provides real-time view of the resources 114, services, and the relationships therebetween. The AAI subsystem can form a registry of active, available, and assigned assets, and also maintains up-to-date views of relationships among assets, including any relevance to different components of ONAP.

A DCAE subsystem is an ONAP subsystem that supports closed loop control and high-level correlation for business and operations activities. The DCAE subsystem can collect performance, usage, and configuration data. The DCAE subsystem performs analytic computations. The DCAE subsystem also aids in troubleshooting and management. The DCAE subsystem publishes events, data, and analytics to other ONAP subsystems.

The design framework 112, in some embodiments, is or includes a service design and creation ("SDC") ONAP subsystem that provides an online catalog of virtual parts for service designers (e.g., the operator(s) 110) to create new reusable building blocks and combine those blocks in different ways to build new services. There are two basic types of building blocks: VNFs 102 and network connectors (not shown). A service designer can select existing VNFs 102 and/or network connectors, or add new VIFs 102 and/or network connectors, and then drag-and-drop the selected building blocks onto a palette and connect the building blocks to build a new service.

The operators(s) 110 can include cloud component vendors, including first or third party vendors, one or more algorithm experts, one or more subject matter experts, one or more operations experts, one or more application experts, and/or other users who can interact with the design framework 112 to create the design goals 108 and/or otherwise effect some aspect of one or more of the VNFs 102.

The design framework 112 can support a collaborative and iterative approach for the operators 110 to design recipes, templates, policies, models, analytics, algorithms, the VNFs 102, and/or at least a portion thereof for implementation in the cloud environments 104, the resources 114 of the cloud environment(s) 104, and/or one or more network configurations for one or more networks with which the cloud environment(s) 104 are in communication. The concepts and technologies disclosed herein will focus on the functionality of the design framework 112 to support the design of VNFs 102.

As used herein, a "recipe" includes a structured set of data that expresses relationships of entities, processes, rules/policies, and/or other relationships used to define configurable management behavior. As used herein, a "template" includes a portal form to capture required parameters, additional parameters, composition graph/type/process, capability and management APIs, capability policies, and other configurable data parameters disclosed herein. As used herein, a "policy" can include a modifiable rule, assertions, and/or conditions under which to enable real-time decision making on corrective actions and configuration changes to the VNFs 102. By way of example, policies can be implemented via policy engines such as Drools or XACML. As used herein, a "model" includes data attributes of objects, the relationships amongst the objects, and the associated management methodologies (e.g., processes, analytics, and policies). As used herein, an "algorithm" includes step-by-step operations to perform calculations, data processing, and automated reasoning. As used herein, "analytics" can be implemented via an analytics engine/application that analyzes the collected data (including analysis of data collected over time) and detects policy violations by discovering temporal, spatial, or geographical patterns in the data.

The design framework 112 can include a user interface through which the user can provide definitions for the VNFs 102, models, templates, recipes, and/or policy for the cloud environment(s) 104, the resources 114, and/or network configurations. These definitions can be stored in a catalog (not shown) of the design framework 112. The design framework 112 also can perform one or more tests as part of a certification process that ensures the VNF(s) 102, models, templates, recipes, and/or policies comply with certification requirements.

The data collection framework 116, in some embodiments, is or includes a data collection, analytics, and events ("DCAE") subsystem of ONAP. The DCAE can support closed loop control and high-level correlation for business and operations activities. The DCAE subsystem collects performance, usage, and configuration data. The DCAE subsystem provides computation of analytics. The DCAE subsystem also aids in troubleshooting and management. The DCAE subsystem publishes events, data, and analytics to other ONAP subsystems.

Figure 1B:
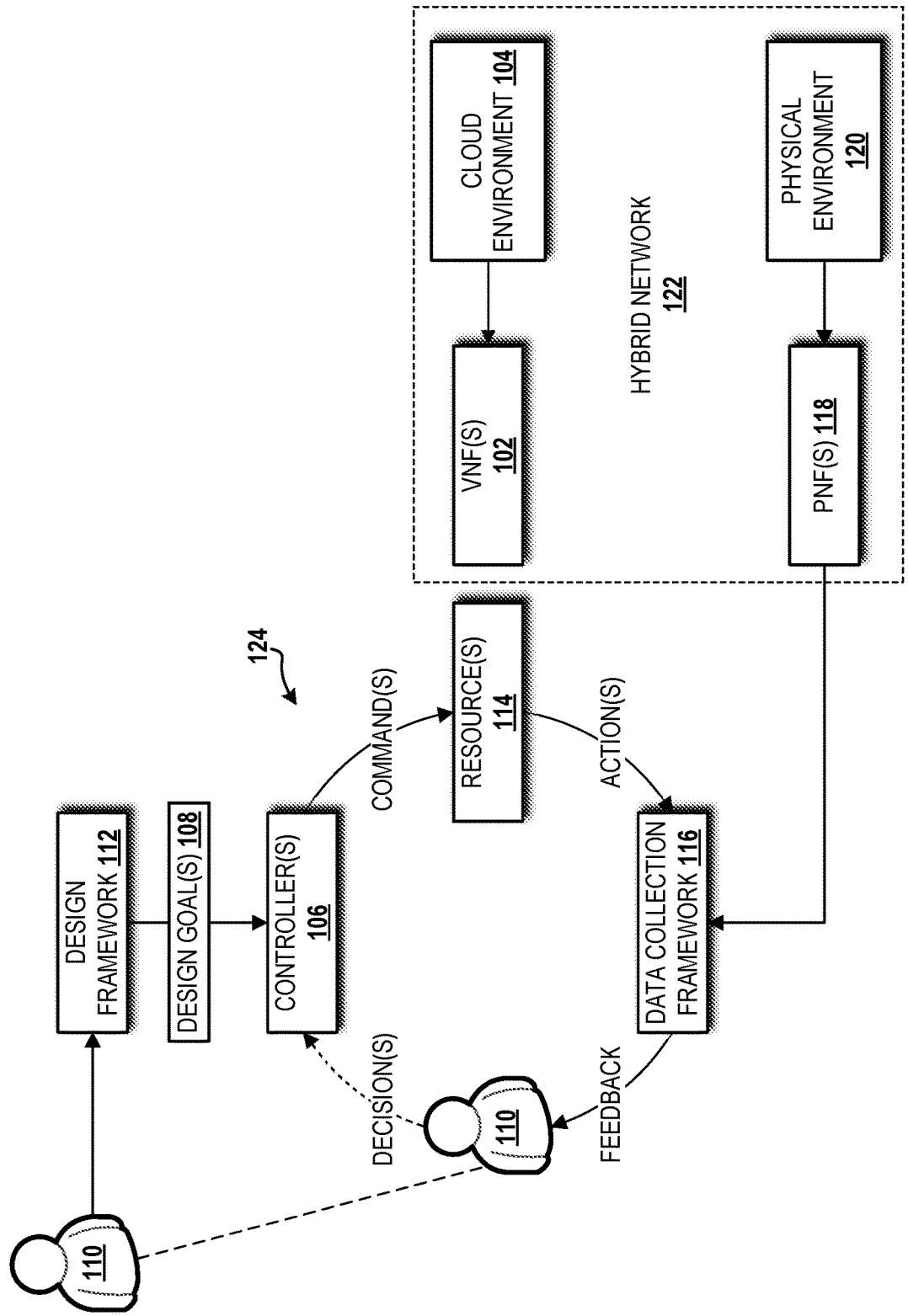
FIG. 1B is a block diagram illustrating aspects of a traditional open-loop control mechanism for automated lifecycle management of VNFs and PNFs operating in a hybrid network.

Closed-loop control mechanisms, such as the traditional closed-loop control mechanism 100 shown in FIG. 1A, are a main feature in automated lifecycle management of VNFs 102, but open-loop control remains a necessary part of the overall control process for managing VNFs 102 and PNFs 118 operating in a physical environment 120, such as at layers 0 and 1, of a hybrid network 122, as best shown in a traditional open-loop control mechanism 124 illustrated in FIG. 1B. In FIG. 1B, the data collection framework 116 collects data from the resources 114 and the PNFs 118, which is accounted for in providing feedback to the operators(s) 110 who can make decisions based upon the feedback and provide those decisions to the controller(s) 106 to influence the controller(s) 106, at least in part, in controlling some aspect of the VNFs 102 and the PNFs 118 in the hybrid network 122.

FIGS. 1A and 1B are examples of traditional control mechanisms for automated lifecycle management of network functions (VNF-only in FIG. 1A; VNF and PNF in FIG. 1B). These examples are simplified to clearly show the differences between traditional control mechanisms and the novel control mechanism disclosed herein that is assisted by an OLCA system, which will now be formally introduced below with reference to FIG. 2.

Figure 2:
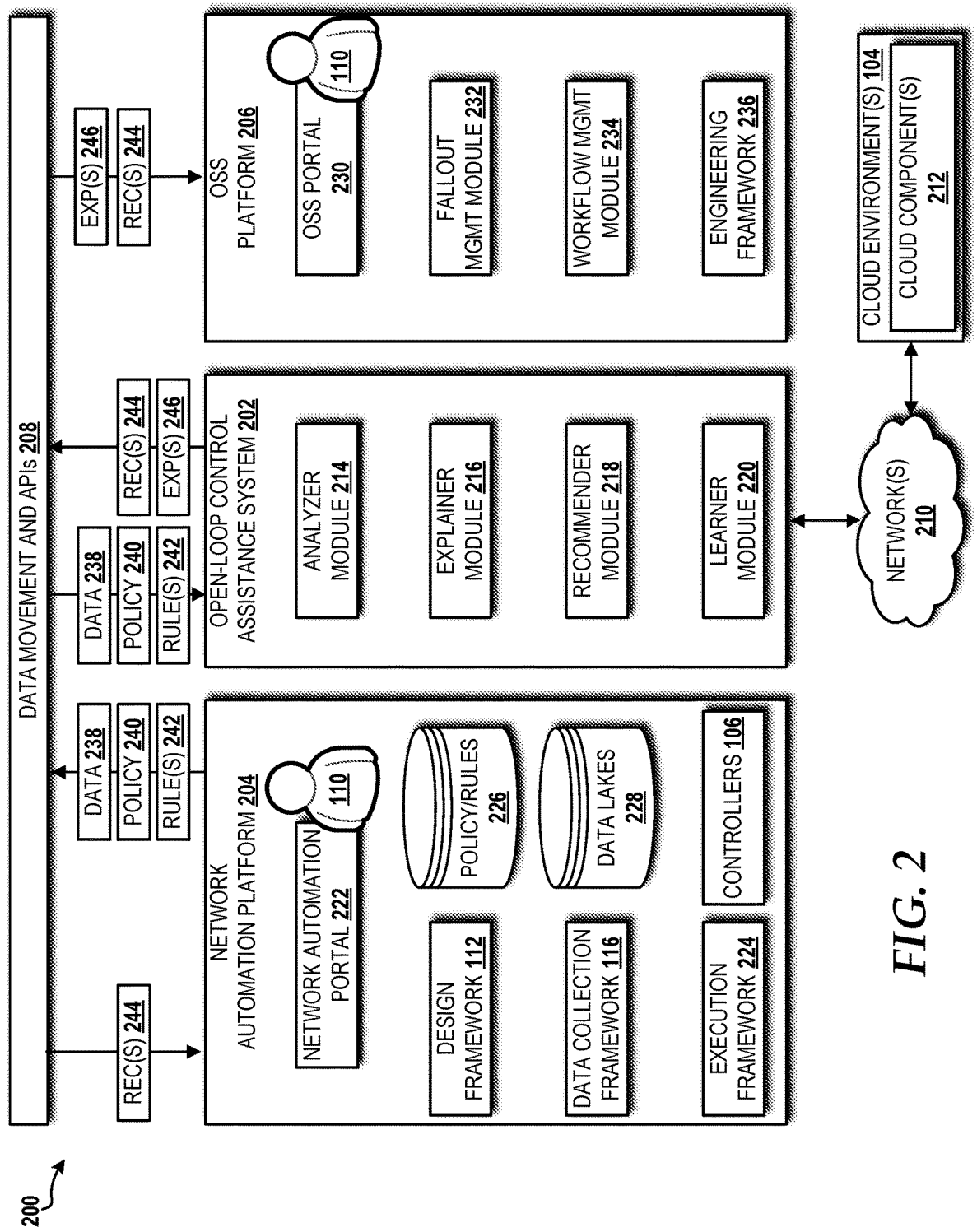
FIG. 2 is a block diagram illustrating an operating environment capable of implementing aspects of the embodiments presented herein.

Turning now to FIG. 2, a block diagram illustrating an operating environment 200 capable of implementing aspects of the embodiments presented herein will be described. The illustrated operating environment includes an OLCA system 202, a network automation platform 204, and an OSS platform 206, which can interface with each other via a set of data movement protocols and APIs 208.

The illustrated OLCA system 202 is in communication with one or more networks 210. The network(s) 210 can include the hybrid network 122 (best shown in FIG. 1B) that, in turn, includes the VNF(s) 102 provided by one or more cloud components 212 operating in the cloud environment(s) 104 and the PNF(s) 118 provided by the physical environment 120.

The OLCA system 202 provides a user-friendly and autonomous solution to assist the operator(s) 110 in the current manual open-loop control processes, such as described above with reference to FIG. 1B. The OLCA system 202 will greatly improve the operational efficiency, reliability, and predictability of the current process in automated life cycle management of the VNFs 102 and the PNFs 118 in the hybrid network 122. The OLCA system 202 can perform self-tuning and gradually gain the trust and confidence of the operator(s) 110, as well as improve the overall effectiveness of open-loop control over time through machine learning capabilities. In addition, the OLCA does not appear as a "black box" to the operator(s) 110, by explaining the exact process reasoning behind the recommended options, as well as allowing the operator(s) 110 to override those system recommendations if he/she chooses to do so, but capturing the rationale and accumulating the operator's knowledge in the data lakes 228.

One of the reasons that open-loop control becomes necessary is when the behavior/feedback of the OLCA system 202 falls outside of the existing policy boundary in the closed-loop control. Typically, when this happens, (1) either a system failure occurs, or (2) the controller 106 applies a default request manual assistance ("RMA") policy, jumps out of the closed-loop, and invokes a fallout management module 232 (described below). For example, in case (1), the OLCA system 202 can perform root cause detection by analyzing the system logging records through machine learning and provide recommendations to prevent similar failures from occurring in the future. A specific example could be hardware failure due to aging. In case (2), the OLCA system 202 can perform reinforcement learning by analyzing system behavior, the policy/rules database 226 (described below), and the records of past manual actions, and determine the best path forward actions, then make choice of recommendations for the operator 110 to select, thus release the operator 110 from doing the data collection, research, and analyzing work him/herself. A specific example is that there is a capacity exhaustion in one location of the physical layer, which hosts a group of virtual machines, and the VNFs 102 have to be manually relocated and restarted to other portion(s) of the physical network.

The illustrated OLCA system 202 includes a plurality of software modules that can be executed by one or more processors (best shown in FIGS. 6 and 7) to perform operations described herein for providing open-loop control assistance to the operator(s) 110. In particular, the plurality of software modules can include an analyzer module 214, an explainer module 216, a recommender module 218, and a learner module 220 as shown in the illustrated example.

The analyzer module 214 correlates and aggregates data 238 from various sources. The analyzer module 214 performs multi-dimensional analytics on the data 238 collected. The analyzer module 214 utilizes simulation and modeling tools as appropriate. The analyzer module 214 can be hidden from the operator(s) 110.

The explainer module 216 retains a record of the sequence of system decision steps (e.g., input data set utilized, policy and rules applied, algorithms and parameters employed, inference logic invoked, and output and conclusions reached). The OCLA system 202 translates complex algorithms, rules, and logic used in the analyzer module 214 and the recommender module 218 into simpler language to be easily understood by the operator(s) 110. The explainer module 216 provides explanations for the system recommended action upon query/request from the operator(s) 110.

The recommender module 218 determines the urgency and types of human intervention required. The recommender module 218 proactively performs a preparation process prior to making a recommendation. The preparation process can include: collecting and analyzing relevant data; searching for relevant policy and rules; compiling a set of corrective actions (in case of fault management); locating the appropriate organization/personnel to route (e.g., in case of workflow approval); identifying the tool/application to invoke next; and pre-populating the data fields. The recommender module 218 presents all the viable options (and their reasoning) for the next action step in open-loop control process. The recommender module 218 recommends the optimal choice of action to the operator(s) 110. The recommender module 218 captures the rationale from the operator(s) 110 if he/she chooses not to follow the recommended option.

The learner module 220 discovers any hidden patterns and signatures on decision logs using a clustering technique in machine learning (e.g., unsupervised learning). The learner module 220 performs machine learning (e.g., reinforcement learning) on the success or failure based upon the result of data analysis and actions taken by the operator(s) 110. The learner module 220 captures the lessons learned (positive or negative) and accumulates the lessons in a knowledge base. The learner module 220 updates policy 240, rules 242, models, algorithms, and parameters used in the analyzer module 214 accordingly, based on machine learning results. The learner module 220 can be hidden from the operator(s) 110.

The illustrated network automation platform 204 includes a network automation portal 222 that provides an interface through which the operator(s) 110 can interact with the components of the network automation platform 204, such as the design framework 112, the data collection framework 116, the controllers 106, the execution framework 224, a policy/rules database 226, and one or more data lakes 228. The design framework 112, the data collection framework 116, and the controllers 106 are all described herein above with reference to FIGS. 1A and 1B.

The network automation portal 222 can be implemented as a web-based user interface or a native user interface. The network automation portal 222 can control access by the operator(s) 110 via any single or multi-factor authentication mechanism.

The execution framework 224 creates and maintains execution environments within the cloud environments 104 upon which the VNFs 102 can be created and managed. The execution framework 224 can interact with the design framework 112 to access a catalog from the design framework 112 to obtain VNF definitions based upon which one or more of the VNFs 102 can be instantiated within an execution environment. The execution framework 224 can adjust/rescale application resource capacities of the cloud components 212 operating in the cloud environments 102 to support one or more of the VNFs 102 and/or to move one or more of the VNFs 102 to healthier components and/or environments. To perform these functions, the execution framework 224 can use policies and/or rules stored in the policy/rules database 226 that dictate the requirements of the VNFs 102. The execution framework 224 can perform operations using the policies and/or rules stored from the policy/rules database 226 and the definitions for the VNFs 102 stored in the catalog of the design framework 112 to coordinate with the controller 106 to instantiate the VNFs 102, monitor, control, and otherwise interact with the VNFs 102.

The data lakes 228 can use big-data storage technologies such as in-memory repositories and support for raw, structured, unstructured, and semi-structured data to accommodate a broad scope of requirements of the network automation platform 204 such as large volume, velocity, and variety. The data lakes 228 can store data received from the data collection framework 116. Embodied as a DCAE, the data collection framework 116 might support numerous applications and use cases ranging from real-time applications that have stringent latency requirements to other analytic applications that have a need to process a range of unstructured and structured data. The data lakes 228 can support these and other needs and provide a scalable solution so that new storage technologies can be incorporated as they become available. The data lakes 228 also can include one or more core data lakes that store reduced, transformed, or aggregated for other analyses, such as some of the analyses disclosed herein.

The OSS platform 206 helps the operator(s) 110 maintain network inventory, provision services, configure components, and resolve network issues via an OSS portal 230. The illustrated OSS platform 206 includes a fallout management module 232, a workflow management module 234, and an engineering framework 236.

The fallout management module 232 performs fallout management, which is part of open-loop control involving manual intervention/action, such as, for example, creating a ticket to invoke testing and diagnostics, scheduling a manual system reboot/reset, or dispatching a field technician. When any fault with no associated policy for closed loop action, or any failed closed loop activity occurs, the workflow management module 234 can route the flow to the fallout management module 232 for manual handling.

The workflow management module 234 can guide, assist, and/or automate manual work efforts, including tickets and service, or more typically, manual decisions made by the operator(s) 110. Manual decisions made by the operator(s) 110 often differ from one operator to another depending on the judgment call by that operator, often based on his/her experience. The lessons learned by the operators 110 in typical open-loop control mechanisms (e.g., as shown in FIG. 1B) are often not captured and retained by existing workflow systems, but instead rely on the operator's memory, and might take a long time to be reflected in operator guidelines or guided workflows, if at all. The workflow management module 234 can receive feedback from the OLCA system 202 in the form of experiences and recommendations to be learned by the workflow management module 234 such that future workflows can be modified as needed to account for such feedback.

The engineering framework 236 can monitor operational aspects of the cloud component(s) 212 in the cloud environment(s) 104 and can respond to changes by controlling environmental adjustments. When determined to be necessary, the engineering framework 236 can aid in ordering additional equipment and coordinating any necessary installation services to ensure the operational aspects of the cloud component(s) in the cloud environment(s) 104 are consistent with specification provided, for example, by the operator(s) 110 via the OSS portal 230.

Interactions among the OLCA system 202, the network automation platform 204, and the OSS platform 206 can be handled via the set of data movement protocols and APIs 208. By way of example, and not limitation, the set of data movement protocols and APIs 208 can be provided, at least in part, as Data Movement as a Platform ("DMaaP") that provides high performing and cost effective data movement data services that transports and processes data from any source to any target with the format, quality, security, and concurrency required to service business and customer needs. In this example, the DMaaP can include a set of common services provided by the network automation platform 204 (e.g., embodied as ONAP), including a message router, data router, and a data bus controller. Other DMaaPs can be implemented to perform similar operations for the concepts and technologies disclosed herein. In some embodiments, the OLCA system 202, the network automation platform 204, and the OSS platform 206 are logical constructs embodied as software that includes instructions that can be executed, at least in part, by one more processors of one or more computing systems, including systems operating as part of the same or a different cloud environment.

In the illustrated example, the network automation platform 204 provides data 238 from the data lakes 228, policies 240 and rules 242 from the policy/rules database 226 to the set of data movement protocols and APIs 208, which, in turn, provides the data 238, the policies 240, and the rules 242 to the OLCA system 202. In response the OLCA system 202 determines one or more viable options to suggest to the operator(s) 110 and provides these options as one or more recommendations 244 and one or more explanations 246 to the data movement protocols and APIs 208, which, in turn, provides the recommendation(s) 244 and the explanation(s) 246 to the network automation platform 204 and the OSS platform 206. The network automation platform 204 can consider the recommendations 244 in future designs created via the design framework 112 by suggestions made to the operator(s) 110 via the network automation portal 222. The OSS platform 206 can present the recommendations 244 and the explanations 246 to the operator(s) 110 for consideration in changes to one or more workflows managed by the workflow management module 234.

Figure 3:
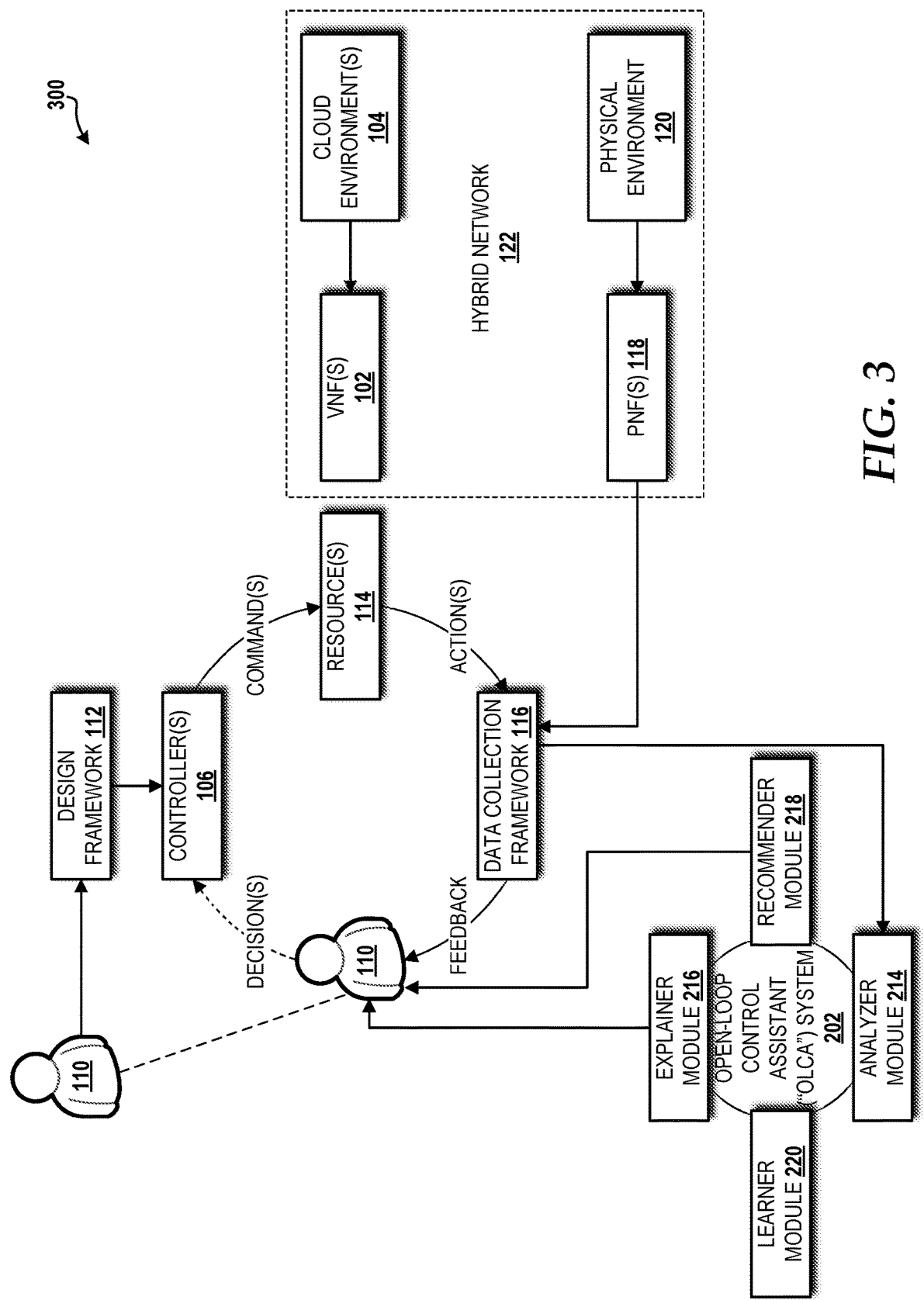
FIG. 3 is a block diagram illustrating an open-loop control mechanism assisted by an open OLCA system for automated lifecycle management of VNFs in a hybrid network, according to an illustrative embodiment.

Turning now to FIG. 3, a block diagram illustrating an open-loop control mechanism 300 assisted by an OLCA system 202 for automated lifecycle management of the VNFs 102 and the PNFs 118 in the hybrid network 122 will be described, according to an illustrative embodiment. The open-loop control mechanism 300 illustrates the VNF(s) 102, the cloud environment(s) 104, the controller(s) 106, the operator(s) 110, the design framework 112, the resources 114, the data collection framework 116, the PNF(s) 118, the physical environment 120, and the hybrid network 122 introduced above with reference to FIGS. 1A and 1B. The open-loop control mechanism 300 also illustrates the OLCA system 202 along with components thereof, including the analyzer module 214, the explainer module 216, the recommender module 218, and the learner module 220 introduced above with reference to FIG. 2.

The OLCA system 202 can systematically guide the operator(s) 110 through the manual process of open-loop control. The OLCA system 202 can provide recommendations to the operator(s) 110 that lead to optimal results for the open-loop control cycle. The OLCA system 202 also retains the lessons learned from the experience and applies the lessons to future open-loop control cycles to improve the recommendations that can be provided to the operator(s) 110.

The OLCA system 202 can support open-loop control due to possible fallout in the closed-loop control process. The OLCA system 202 can support open-loop control because certain steps require human intervention by design (e.g., an approval step in a workflow). Moreover, the OLCA system 202 can be used when the human-on-the-loop automation process has not yet reached the end goal of closed loop control or the service path is still contained within a hybrid network 122 that includes both VNFs 102 in a cloud environment 104 and PNFs 118 in a physical environment 120.

Figure 4:
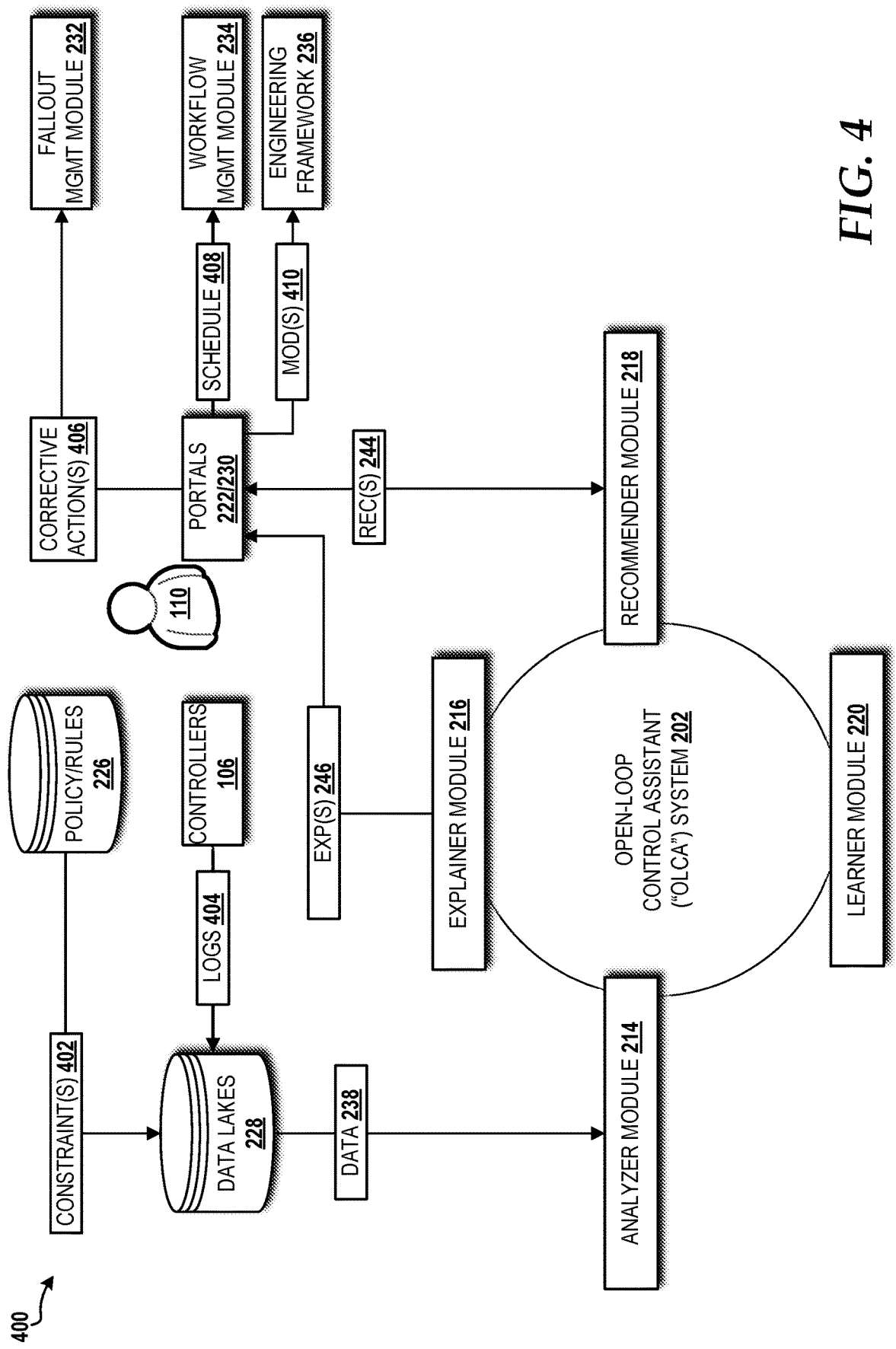
FIG. 4 is a block diagram illustrating an OLCA machine learning cycle performed by the OLCA system, according to an illustrative embodiment.
Figure 5:
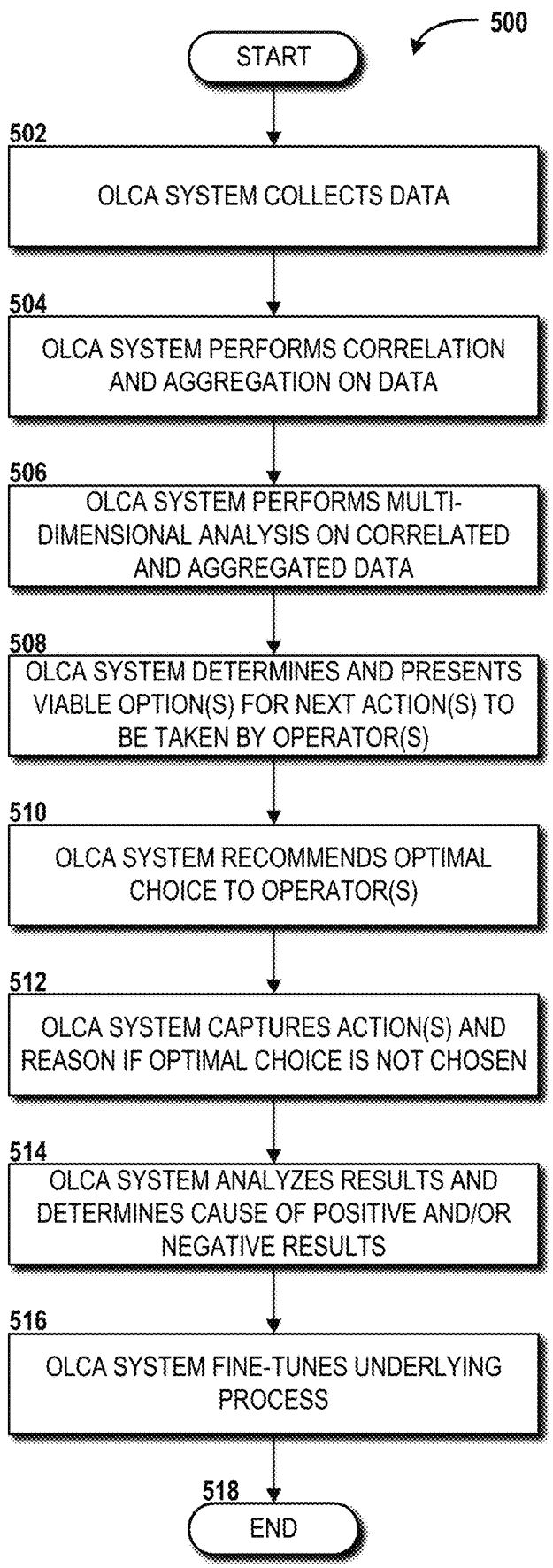
FIG. 5 is a flow diagram illustrating aspects of a method for performing an OLCA machine learning cycle, according to an illustrative embodiment.

Turning now to FIGS. 4 and 5, a block diagram illustrating an OLCA machine learning cycle 400 (FIG. 4) performed by the OLCA system 202 will be described with further reference to a method 500 (FIG. 5) for performing the OLCA machine learning cycle 400, according to an illustrated embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, or components disclosed herein to perform operations. It should be understood that the performance of one or more operations may include operations executed by one or more virtual processors at the instructions of one or more of the aforementioned hardware processors.

The illustrated method 500 begins and proceeds to operation 502, where the OLCA system 202 collects, via the analyzer module 214, the data 238 from the data lakes 228. The data 238 can include one or more constraints 402 received from the policy/rules database 226. The data 238 also can include one or more logs 404 from the controllers 106. The data 238 can additionally contain information regarding workflow activities such as tracking, metrics, and analytics, as well as information regarding milestones and costs.

From operation 502, the method 500 proceeds to operation 504, where the OLCA system 202, via the analyzer module 214, correlates and aggregates the data 238 collected at operation 502. From operation 504, the method 500 proceeds to operation 506, where the OLCA system 202, via the analyzer module 214, performs multi-dimensional analysis on the correlated and aggregated data. The multi-dimensional analysis performed at operation 504 can utilize simulation and modeling tools as appropriate. The multi-dimensional analysis can be performed via the learner module 220 to discover any hidden patterns and/or signatures in the data 238 (e.g., particularly in the logs 404) using a clustering technique in machine learning (e.g., unsupervised learning).

From operation 506, the method 500 proceeds to operation 508, where the OLCA system 202, via the recommender module 218, determines one or more viable options for one or more next actions to be taken by the operator(s) 110. As part of operation 508, the recommender module 218 can determine the urgency and type(s) of human intervention required and can proactively perform preparation processes for selecting the recommended options. In particular, the recommender module 218 can collect and analyze relevant data as determined through the multi-dimensional analysis at operation 506; search for relevant policy 240 and/or rules 242 to be applied; compile a set of corrective actions 406 to be reported to the fallout management module 232; locate the appropriate organization/personnel (such as the operator(s) 110); and identify the tool/application to invoke (schedule 408), and pre-populating data fields. The recommender module 218 can then present all of the viable options and reasoning in support of each for the next action to be taken in the open-loop control process.

From operation 508, the method 500 proceeds to operation 510, where the OLCA system 202, via the recommender module 218, recommends (via recommendation 244) the optimal choice selected from the viable option(s) determined at operation 508. Selection of the optimal choice can be 244 can be based, at least in part, upon application of the constraints received from the policy/rules database 226 and/or results of the multi-dimensional analysis performed by the analyzer module 214 at operation 506, for example.

From operation 510, the method 500 proceeds to operation 512, where the OLCA system 202, via the recommender module 218, captures any action(s) taken by the operator(s) 110 and the reason(s) provided by the operator(s) 110 if he/she chooses not to follow the optimal choice of next action(s) identified in the recommendation 244. The rationale can be presented in the form of system decision steps taken by the OLCA system 202. The action(s) taken and corresponding rationale can be captured directly or indirectly. For example, if the operator(s) 110 overruled the recommended choice of next action(s), the rationale can include a reasons for the override, or a simple explanation that the operator(s) 110 selected a different choice.

From operation 512, the method 500 proceeds to operation 514, where the OLCA system 202 analyzes the results of the action(s) taken by the operator(s) 110, and determines the cause of any positive and/or negative results. The learner module 220 can perform machine learning processes (e.g., reinforcement learning) on the results and can determine lessons learned (positive or negative), which can be collected and stored within a knowledge base (not shown) of the OLCA system 202.

From operation 514, the method 500 proceeds to operation 516, where the OLCA system 202, via the learner module 220, fine-tunes the underlying open-loop control process. For example, the OLCA system 202 can update, modify, or otherwise change (e.g., select an alternative) any of the policies, rules, models, algorithms, parameters, and/or the like (mods 410) used in the open-loop control process based upon the results analyzed at operation 514. The OLCA system 202 can then update operation 510 to ensure the recommendations generation process is updated with the latest version of the open-loop control process. From operation 516, the method 500 proceeds to operation 518, where the method 500 ends.

Figure 6:
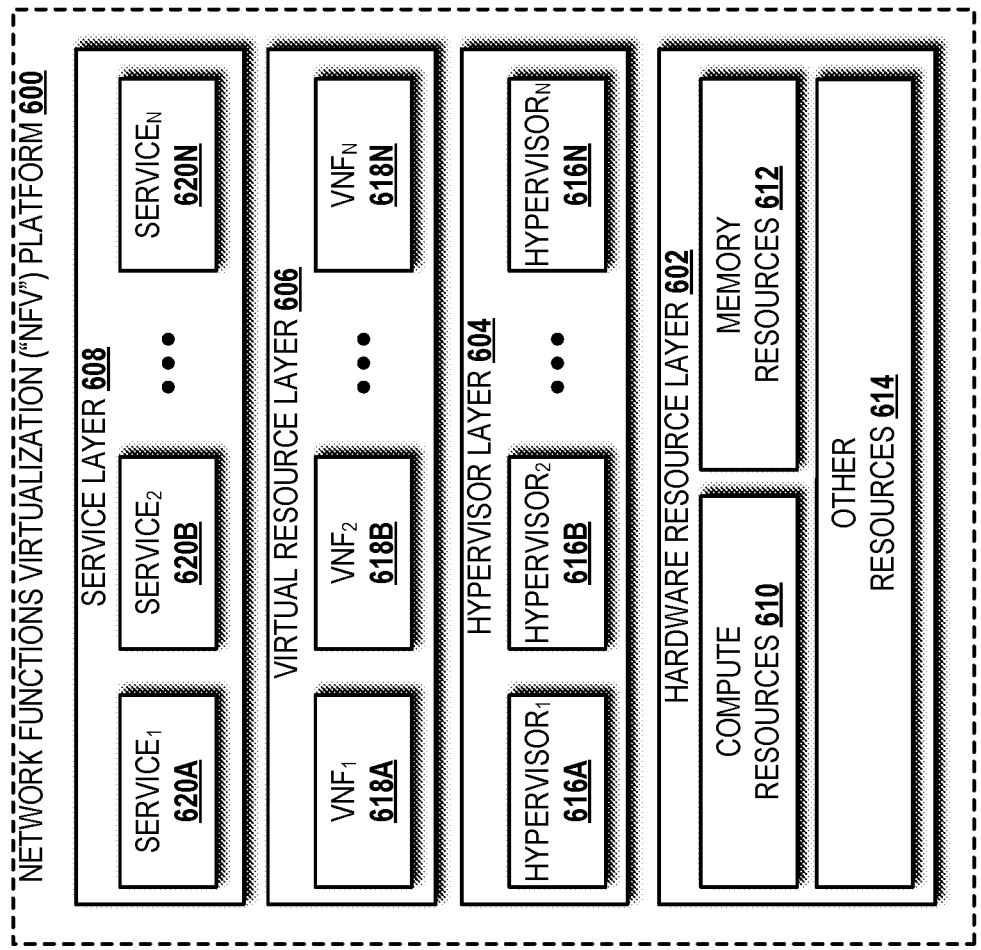
FIG. 6 is a block diagram illustrating aspects of an illustrative cloud environment capable of implementing aspects of the embodiments presented herein.

Turning now to FIG. 6, an illustrative NFV platform 600 will be described, according to an illustrative embodiment. The NFV platform 600 includes a hardware resource layer 602, a hypervisor layer 604, a virtual resource layer 606, and a service layer 608. While no connections are shown between the layers illustrated in FIG. 6, it should be understood that some, none, or all of the components illustrated in FIG. 6 can be configured to interact with one other to carry out various functions described herein. In some embodiments, the components are arranged so as to communicate via one or more networks. Thus, it should be understood that FIG. 6 and the remaining description are intended to provide a general understanding of a suitable environment in which various aspects of the embodiments described herein can be implemented and should not be construed as being limiting in any way.

The hardware resource layer 602 provides hardware resources. In the illustrated embodiment, the hardware resource layer 602 includes one or more compute resources 610, one or more memory resources 612, and one or more other resources 614.

The compute resource(s) 610 can include one or more hardware components that perform computations to process data and/or to execute computer-executable instructions of one or more application programs, one or more operating systems, and/or other software. In particular, the compute resources 610 can include one or more central processing units ("CPUs") configured with one or more processing cores. The compute resources 610 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the compute resources 610 can include one or more discrete GPUs. In some other embodiments, the compute resources 610 can include CPU and GPU components that are configured in accordance with a co-processing CPU/GPU computing model, wherein the sequential part of an application executes on the CPU and the computationally-intensive part is accelerated by the GPU processing capabilities. The compute resources 610 can include one or more system-on-chip ("SoC") components along with one or more other components, including, for example, one or more of the memory resources 612, and/or one or more of the other resources 614. In some embodiments, the compute resources 610 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 610 can be or can include one or more hardware components architected in accordance with an ARM architecture, available for license from ARM HOLDINGS of Cambridge, United Kingdom. Alternatively, the compute resources 610 can be or can include one or more hardware components architected in accordance with an x86 architecture, such an architecture available from INTEL CORPORATION of Mountain View, Calif., and others. Those skilled in the art will appreciate the implementation of the compute resources 610 can utilize various computation architectures, and as such, the compute resources 610 should not be construed as being limited to any particular computation architecture or combination of computation architectures, including those explicitly disclosed herein.

The memory resource(s) 612 can include one or more hardware components that perform storage/memory operations, including temporary or permanent storage operations. In some embodiments, the memory resource(s) 612 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 610.

The other resource(s) 614 can include any other hardware resources that can be utilized by the compute resources(s) 610 and/or the memory resource(s) 612 to perform operations described herein. The other resource(s) 614 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 602 can be virtualized by one or more hypervisors 616A-616N (also known as "virtual machine monitors") operating within the hypervisor layer 604 to create virtual resources that reside in the virtual resource layer 606. The hypervisors 616A-616N can be or can include software, firmware, and/or hardware that alone or in combination with other software, firmware, and/or hardware, creates and manages virtual resources operating within the virtual resource layer 606.

The virtual resources operating within the virtual resource layer 606 can include abstractions of at least a portion of the compute resources 610, the memory resources 612, and/or the other resources 614, or any combination thereof. In some embodiments, the abstractions can include one or more virtual machines upon which one or more applications can be executed. In the illustrated example, the applications can be embodied as VNFs 618A-618N that provide, at least in part, one or more services 620A-620N. The VNFs 618A-618N can include the VNFs 102 (FIG. 1).

Figure 7:
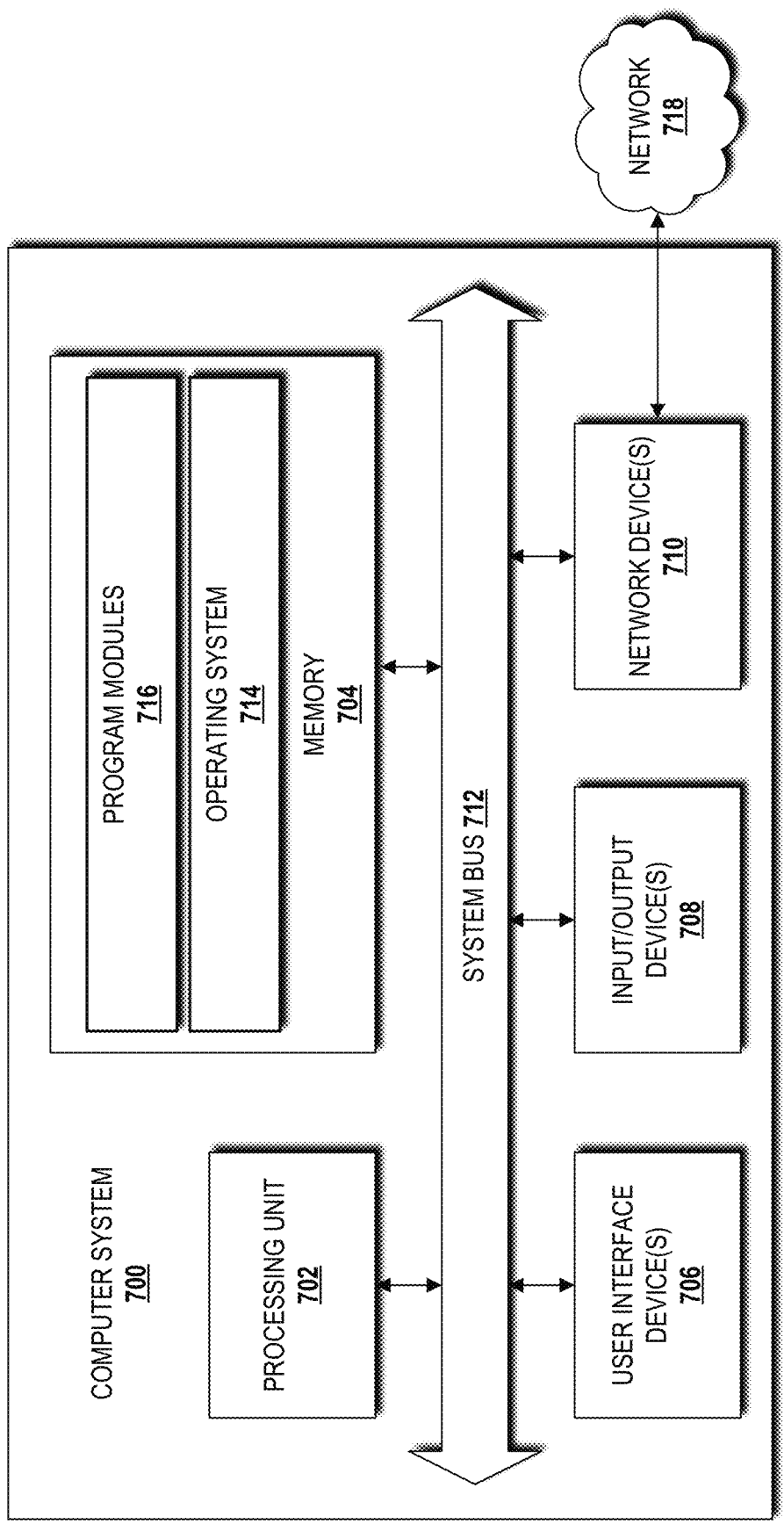
FIG. 7 is a block diagram illustrating an example mobile device capable of implementing aspects of the embodiments disclosed herein.

FIG. 7 is a block diagram illustrating a computer system 700 configured to provide the functionality in accordance with various embodiments of the concepts and technologies disclosed herein. The computer system 700 may provide at least a portion of the compute resources 610, the memory resources 612, and/or the other resources 614. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 610 (illustrated in FIG. 6) can include one or more processing units 702.

The memory 704 communicates with the processing unit 702 via the system bus 712. In some embodiments, the memory 704 is operatively connected to a memory controller (not shown) that enables communication with the processing unit 702 via the system bus 712. The memory resources 612 (illustrated in FIG. 6) can include one or more instances of the memory 704. The illustrated memory 704 contains an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be a wired network such as, but not limited to, a Wide Area Network ("WAN"), a wired Personal Area Network ("PAN"), or a wired Metropolitan Area Network ("MAN"). The network 718 may be or may include any other network described herein.

Figure 8:
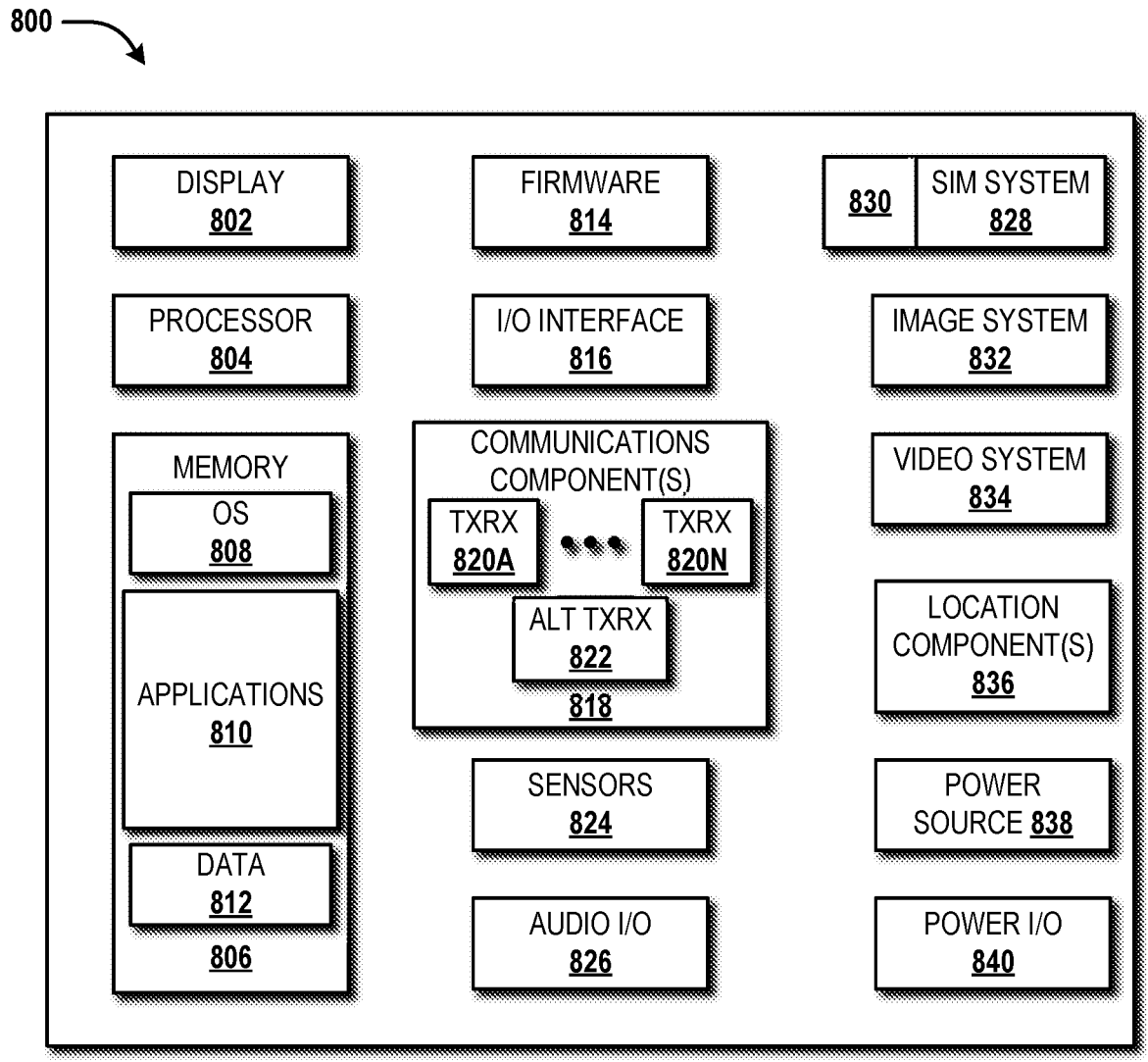
FIG. 8 is a block diagram illustrating an example computer system capable of implementing aspects of the embodiments presented herein.

Turning now to FIG. 8, an illustrative mobile device 800 and components thereof will be described. While connections are not shown between the various components illustrated in FIG. 8, it should be understood that some, none, or all of the components illustrated in FIG. 8 can be configured to interact with one other to carry out various device functions. In some embodiments, the components are arranged so as to communicate via one or more busses (not shown). Thus, it should be understood that FIG. 8 and the following description are intended to provide a general understanding of a suitable environment in which various aspects of embodiments can be implemented, and should not be construed as being limiting in any way.

As illustrated in FIG. 8, the mobile device 800 can include a display 802 for displaying data. According to various embodiments, the display 802 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 800 also can include a processor 804 and a memory or other data storage device ("memory") 806. The processor 804 can be configured to process data and/or can execute computer-executable instructions stored in the memory 806. The computer-executable instructions executed by the processor 804 can include, for example, an operating system 808, one or more applications 810, other computer-executable instructions stored in a memory 806, or the like. In some embodiments, the applications 810 also can include a user interface ("UI") application (not illustrated in FIG. 8).

The UI application can interface with the operating system 808 to facilitate user interaction with functionality and/or data stored at the mobile device 800 and/or stored elsewhere. In some embodiments, the operating system 808 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 804 to aid a user in entering content, viewing account information, answering/initiating calls, entering/deleting data, entering and setting user IDs and passwords for device access, configuring settings, manipulating address book content and/or settings, multimode interaction, interacting with other applications 810, and otherwise facilitating user interaction with the operating system 808, the applications 810, and/or other types or instances of data 812 that can be stored at the mobile device 800. The data 812 can include, for example, one or more identifiers, and/or other applications or program modules. According to various embodiments, the data 812 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 810, the data 812, and/or portions thereof can be stored in the memory 806 and/or in a firmware 814, and can be executed by the processor 804. The firmware 814 also can store code for execution during device power up and power down operations. It can be appreciated that the firmware 814 can be stored in a volatile or non-volatile data storage device including, but not limited to, the memory 806 and/or a portion thereof.

The mobile device 800 also can include an input/output ("I/O") interface 816. The I/O interface 816 can be configured to support the input/output of data such as location information, user information, organization information, presence status information, user IDs, passwords, and application initiation (start-up) requests. In some embodiments, the I/O interface 816 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 800 can be configured to synchronize with another device to transfer content to and/or from the mobile device 800. In some embodiments, the mobile device 800 can be configured to receive updates to one or more of the applications 810 via the I/O interface 816, though this is not necessarily the case. In some embodiments, the I/O interface 816 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 816 may be used for communications between the mobile device 800 and a network device or local device.

The mobile device 800 also can include a communications component 818. The communications component 818 can be configured to interface with the processor 804 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 818 includes a multimode communications subsystem for facilitating communications via the cellular network and one or more other networks.

The communications component 818, in some embodiments, includes one or more transceivers. The one or more transceivers, if included, can be configured to communicate over the same and/or different wireless technology standards with respect to one another. For example, in some embodiments one or more of the transceivers of the communications component 818 may be configured to communicate using Global System for Mobile communications ("GSM"), Code Division Multiple Access ("CDMA") ONE, CDMA6000, Long-Term Evolution ("LTE"), and various other 6G, 6.5G, 3G, 4G, and greater generation technology standards. Moreover, the communications component 818 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 818 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 818 can include a first transceiver ("TxRx") 820A that can operate in a first communications mode (e.g., GSM). The communications component 818 also can include an $N^{th}$ transceiver ("TxRx") 820N that can operate in a second communications mode relative to the first transceiver 820A (e.g., UMTS). While two transceivers 820A-820N (hereinafter collectively and/or generically referred to as "transceivers 820") are shown in FIG. 8, it should be appreciated that less than two, two, and/or more than two transceivers 820 can be included in the communications component 818.

The communications component 818 also can include an alternative transceiver ("Alt TxRx") 822 for supporting other types and/or standards of communications. According to various contemplated embodiments, the alternative transceiver 822 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 818 also can facilitate reception from terrestrial radio networks, digital satellite radio networks, internet-based radio service networks, combinations thereof, and the like. The communications component 818 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 800 also can include one or more sensors 824. The sensors 824 can include temperature sensors, light sensors, air quality sensors, movement sensors, orientation sensors, noise sensors, proximity sensors, or the like. As such, it should be understood that the sensors 824 can include, but are not limited to, accelerometers, magnetometers, gyroscopes, infrared sensors, noise sensors, microphones, combinations thereof, or the like. Additionally, audio capabilities for the mobile device 800 may be provided by an audio I/O component 826. The audio I/O component 826 of the mobile device 800 can include one or more speakers for the output of audio signals, one or more microphones for the collection and/or input of audio signals, and/or other audio input and/or output devices.

The illustrated mobile device 800 also can include a subscriber identity module ("SIM") system 828. The SIM system 828 can include a universal SIM ("USIM"), a universal integrated circuit card ("UICC") and/or other identity devices. The SIM system 828 can include and/or can be connected to or inserted into an interface such as a slot interface 830. In some embodiments, the slot interface 830 can be configured to accept insertion of other identity cards or modules for accessing various types of networks. Additionally, or alternatively, the slot interface 830 can be configured to accept multiple subscriber identity cards. Because other devices and/or modules for identifying users and/or the mobile device 800 are contemplated, it should be understood that these embodiments are illustrative, and should not be construed as being limiting in any way.

The mobile device 800 also can include an image capture and processing system 832 ("image system"). The image system 832 can be configured to capture or otherwise obtain photos, videos, and/or other visual information. As such, the image system 832 can include cameras, lenses, charge-coupled devices ("CCDs"), combinations thereof, or the like. The mobile device 800 may also include a video system 834. The video system 834 can be configured to capture, process, record, modify, and/or store video content. Photos and videos obtained using the image system 832 and the video system 834, respectively, may be added as message content to an MMS message, email message, and sent to another mobile device. The video and/or photo content also can be shared with other devices via various types of data transfers via wired and/or wireless communication devices as described herein.

The mobile device 800 also can include one or more location components 836. The location components 836 can be configured to send and/or receive signals to determine a geographic location of the mobile device 800. According to various embodiments, the location components 836 can send and/or receive signals from global positioning system ("GPS") devices, assisted GPS ("A-GPS") devices, WI-FI/WIMAX and/or cellular network triangulation data, combinations thereof, and the like. The location component 836 also can be configured to communicate with the communications component 818 to retrieve triangulation data for determining a location of the mobile device 800. In some embodiments, the location component 836 can interface with cellular network nodes, telephone lines, satellites, location transmitters and/or beacons, wireless network transmitters and receivers, combinations thereof, and the like. In some embodiments, the location component 836 can include and/or can communicate with one or more of the sensors 824 such as a compass, an accelerometer, and/or a gyroscope to determine the orientation of the mobile device 800. Using the location component 836, the mobile device 800 can generate and/or receive data to identify its geographic location, or to transmit data used by other devices to determine the location of the mobile device 800. The location component 836 may include multiple components for determining the location and/or orientation of the mobile device 800.

The illustrated mobile device 800 also can include a power source 838. The power source 838 can include one or more batteries, power supplies, power cells, and/or other power subsystems including alternating current ("AC") and/or direct current ("DC") power devices. The power source 838 also can interface with an external power system or charging equipment via a power I/O component 840. Because the mobile device 800 can include additional and/or alternative components, the above embodiment should be understood as being illustrative of one possible operating environment for various embodiments of the concepts and technologies described herein. The described embodiment of the mobile device 800 is illustrative, and should not be construed as being limiting in any way.

Figure 9:
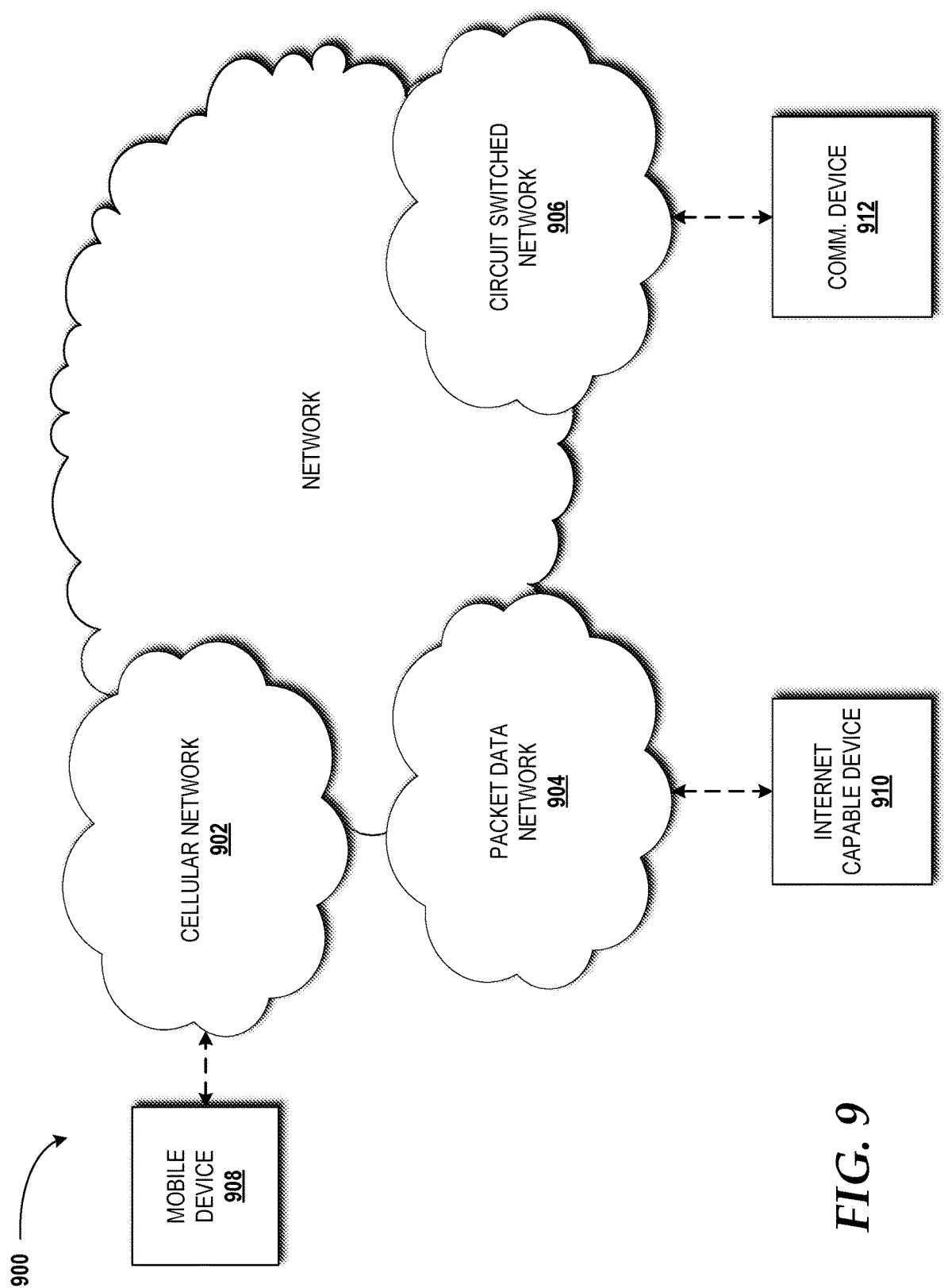
FIG. 9 is a diagram illustrating a network, according to an illustrative embodiment.

Turning now to FIG. 9, details of a network 900 are illustrated, according to an illustrative embodiment. The network 900 includes a cellular network 902, a packet data network 904, for example, the Internet, and a circuit switched network 906, for example, a PSTN. The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, video data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, and combinations thereof, can be operatively connected to the cellular network 902. The cellular network 902 can be configured as a 6G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 includes various devices, for example, servers, computers, databases, routers, packet gateways, and other devices in communication with one another, as is generally known. The packet data network 904 can be or can include the hybrid network 122 that provides connectivity to the cloud environment(s) 104 illustrated and described with reference to FIG. 1B. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a POTS. The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network is used to refer broadly to any combination of the networks 902, 904, 906.

Based on the foregoing, it should be appreciated that concepts and technologies directed to an open-loop control assistant to guide human-machine interactions has been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. An open-loop control assistance system comprising:
a processor; and
memory having instructions stored thereon that, when executed by the processor, cause the processor to perform operations comprising
collecting data from a plurality of sources,
correlating and aggregating the data to create correlated and aggregated data,
performing multi-dimensional analytics on the correlated and aggregated data,
determining, based, at least in part, upon the multi-dimensional analytics, a plurality of viable options for a next action to be taken by an operator in an open-loop control process,
determining a specific option of the plurality of viable options as an optimal choice for the operator to select,
generating a recommendation for the operator to select the optimal choice from the plurality of viable options,
presenting the plurality of viable options to the operator and a rationale explaining why the operator should select the specific option as the optimal choice from the plurality of viable options,
capturing an action taken by the operator, and if the action does not correspond to a specific action identified in the specific option, then further capturing a reason provided by the operator regarding why the optimal choice was not selected,
analyzing results from the action taken by the operator,
determining if the results are positive or negative, and at least one cause thereof, and
fine-tuning the open-loop control process based, at least in part, upon the results and the at least one cause.

2. The open-loop control assistance system of claim 1, wherein collecting the data from the plurality of sources comprises collecting the data from a network automation platform.

3. The open-loop control assistance system of claim 2, wherein the network automation platform comprises at least one data lake, a plurality of controllers, and a policy/rule database; and wherein the data comprises big-data from the at least one data lake, logs from the plurality of controllers, and at least one policy/rule from the policy/rule database.

4. The open-loop control assistance system of claim 1, wherein performing multi-dimensional analytics on the correlated and aggregated data comprises applying an unsupervised learning technique implemented via machine learning to identify clusters among the data and to discover any hidden patterns and signatures contained therein.

5. The open-loop control assistance system of claim 1, wherein the rationale comprises a plurality of system decision steps taken by the open-loop control assistance system to arrive at the specific option of the plurality of viable options being the optimal choice for the operator to select.

6. The open-loop control assistance system of claim 1, wherein fine-tuning the open-loop control process comprises updating a process for generating the recommendation for the operator to select the optimal choice from the plurality of viable options.

7. The open-loop control assistance system of claim 1, wherein fine-tuning the open-loop control process comprises updating a policy, a rule, a model, an algorithm, or a parameter used during at least one previous instance of the open-loop control process.

8. A method comprising:
collecting, by an open-loop control assistance system comprising a processor, data from a plurality of sources;
correlating and aggregating, by the open-loop control assistance system, the data to create correlated and aggregated data;
performing, by the open-loop control assistance system, multi-dimensional analytics on the correlated and aggregated data;
determining, by the open-loop control assistance system, based, at least in part, upon the multi-dimensional analytics, a plurality of viable options for a next action to be taken by an operator in an open-loop control process;
determining, by the open-loop control assistance system, a specific option of the plurality of viable options as an optimal choice for the operator to select;
generating, by the open-loop control assistance system, a recommendation for the operator to select the optimal choice from the plurality of viable options;
presenting, by the open-loop control assistance system, the plurality of viable options to the operator and a rationale explaining why the operator should select the specific option as the optimal choice from the plurality of viable options;
capturing, by the open-loop control assistance system, an action taken by the operator, and if the action does not correspond to a specific action identified in the specific option, then further capturing a reason provided by the operator regarding why the optimal choice was not selected;
analyzing, by the open-loop control assistance system, results from the action taken by the operator;
determining, by the open-loop control assistance system, if the results are positive or negative, and at least one cause thereof; and
fine-tuning, by the open-loop control assistance system, the open-loop control process based, at least in part, upon the results and the at least one cause.

9. The method of claim 8, wherein collecting the data from the plurality of sources comprises collecting the data from a network automation platform.

10. The method of claim 9, wherein the network automation platform comprises at least one data lake, a plurality of controllers, and a policy/rule database; and wherein the data comprises big-data from the at least one data lake, logs from the plurality of controllers, and at least one policy/rule from the policy/rule database.

11. The method of claim 8, wherein performing multi-dimensional analytics on the correlated and aggregated data comprises applying an unsupervised learning technique implemented via machine learning to identify clusters among the data and to discover any hidden patterns and signatures contained therein.

12. The method of claim 8, wherein the rationale comprises a plurality of system decision steps taken by the open-loop control assistance system to arrive at the specific option of the plurality of viable options being the optimal choice for the operator to select.

13. The method of claim 8, wherein fine-tuning the open-loop control process comprises updating a process for generating the recommendation for the operator to select the optimal choice from the plurality of viable options.

14. The method of claim 8, wherein fine-tuning the open-loop control process comprises updating a policy, a rule, a model, an algorithm, or a parameter used during at least one previous instance of the open-loop control process.

15. A computer-readable storage medium comprising computer-executable instructions that, when executed by a processor of an open-loop control assistance system, causes the processor to perform operations comprising:
   collecting data from a plurality of sources;
   correlating and aggregating the data to create correlated and aggregated data;
   performing multi-dimensional analytics on the correlated and aggregated data;
   determining, based, at least in part, upon multi-dimensional analytics, a plurality of viable options for a next action to be taken by an operator in an open-loop control process;
   determining a specific option of the plurality of viable options as an optimal choice for the operator to select;
   generating a recommendation for the operator to select the optimal choice from the plurality of viable options;
   presenting the plurality of viable options to the operator and a rationale explaining why the operator should select the specific option as the optimal choice from the plurality of viable options;
   capturing an action taken by the operator, and if the action does not correspond to a specific action identified in the specific option, then further capturing a reason provided by the operator regarding why the optimal choice was not selected;
   analyzing results from the action taken by the operator;
   determining if the results are positive or negative, and at least one cause thereof; and
   fine-tuning the open-loop control process based, at least in part, upon the results and the at least one cause.

16. The computer-readable storage medium of claim 15, wherein collecting the data from the plurality of sources comprises collecting the data from a network automation platform.

17. The computer-readable storage medium of claim 16, wherein the network automation platform comprises at least one data lake, a plurality of controllers, and a policy/rule database; and wherein the data comprises big-data from the at least one data lake, logs from the plurality of controllers, and at least one policy/rule from the policy/rule database.

18. The computer-readable storage medium of claim 15, wherein performing multi-dimensional analytics on the correlated and aggregated data comprises applying an unsupervised learning technique implemented via machine learning to identify clusters among the data and to discover any hidden patterns and signatures contained therein.

19. The computer-readable storage medium of claim 15, wherein the rationale comprises a plurality of system decision steps taken by the open-loop control assistance system to arrive at the specific option of the plurality of viable options being the optimal choice for the operator to select.

20. The computer-readable storage medium of claim 15, wherein fine-tuning the open-loop control process comprises:
   updating a process for generating the recommendation for the operator to select the optimal choice from the plurality of viable options; or
   updating a policy, a rule, a model, an algorithm, or a parameter used during at least one previous instance of the open-loop control process.

* * * * *